United States Patent
Amaral Barros et al.

(10) Patent No.: US 10,612,940 B2
(45) Date of Patent: Apr. 7, 2020

(54) FLOW METER READING WITH IMAGE RECOGNITION SECURED WITH MASK AND SOFTWARE CONNECTED BY MOBILE DEVICE

(71) Applicant: International Business Machines Corporation, Armonk, NY (US)

(72) Inventors: Ruberth Andre Amaral Barros, Rio de Janeiro (BR); Paul Borrel, Rio de Janeiro (BR); Alvaro Bueno Buoro, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 15/820,250

(22) Filed: Nov. 21, 2017

(65) Prior Publication Data

US 2019/0154463 A1    May 23, 2019

(51) Int. Cl.
*G06K 9/00* (2006.01)
*G01D 4/00* (2006.01)
*H04L 29/06* (2006.01)
*G06K 9/62* (2006.01)
*G06K 9/34* (2006.01)
(Continued)

(52) U.S. Cl.
CPC .............. *G01D 4/006* (2013.01); *G06F 16/51* (2019.01); *G06K 9/00664* (2013.01); *G06K 9/00771* (2013.01); *G06K 9/325* (2013.01); *G06K 9/342* (2013.01); *G06K 9/6262* (2013.01); *H04L 63/0428* (2013.01); *H04L 63/123* (2013.01); *H04W 4/38* (2018.02); *H04W 12/02* (2013.01); *H04W 12/10* (2013.01); *G01D 4/008* (2013.01);
(Continued)

(58) Field of Classification Search
None
See application file for complete search history.

(56) References Cited

U.S. PATENT DOCUMENTS

| | | | |
|---|---|---|---|
| 2007/0057814 A1 | 3/2007 | Goldberg | |
| 2010/0117856 A1* | 5/2010 | Sonderegger | G06Q 10/06 340/870.02 |

(Continued)

FOREIGN PATENT DOCUMENTS

| | | |
|---|---|---|
| WO | WO 2006/021963 A2 | 3/2006 |
| WO | WO 2014/106661 A1 | 7/2014 |

(Continued)

OTHER PUBLICATIONS

Gallo, Ignazio, et al;. "Robust Angle Invariant GAS meter reading." Digital Image Computing: Techniques and Applications (DICTA), 2015 International Conference on. IEEE, 2015.

*Primary Examiner* — Delomia L Gilliard
(74) *Attorney, Agent, or Firm* — Joseph Petrokaitis, Esq.; McGinn IP Law Group, PLLC

(57) ABSTRACT

A system, product, and method of automatic reading any flow metering device, including generating a first image of the device associated and secured with a mobile device with a camera, recognizing a type of device according to a database of metering's, generating a mask for any following image based on the mobile device and the first image, based on any following image, analyzing it to extract information based on the image recognition related to the type of device, and validating the extracted information with location, timestamp, and the mask.

20 Claims, 14 Drawing Sheets

(51) Int. Cl.
  *G06F 16/51* (2019.01)
  *G06K 9/32* (2006.01)
  *H04W 12/02* (2009.01)
  *H04W 4/38* (2018.01)
  *H04W 12/10* (2009.01)
  *G06Q 50/06* (2012.01)

(52) U.S. Cl.
  CPC ..... *G06K 2209/01* (2013.01); *G06K 2209/03* (2013.01); *G06Q 50/06* (2013.01)

(56) References Cited

U.S. PATENT DOCUMENTS

| | | | |
|---|---|---|---|
| 2011/0109472 A1 | 5/2011 | Spirakis | |
| 2014/0320665 A1* | 10/2014 | Feldman | G01D 4/008 |
| | | | 348/160 |
| 2015/0084785 A1 | 3/2015 | Lesbirel | |
| 2017/0364734 A1* | 12/2017 | Melugin | G01D 4/008 |
| 2018/0063092 A1* | 3/2018 | Ollikainen | G06F 21/6245 |

FOREIGN PATENT DOCUMENTS

| | | | |
|---|---|---|---|
| WO | WO 2016/060784 A1 | 4/2016 | |
| WO | WO-2018015822 A1 * | 1/2018 | G01D 4/004 |

* cited by examiner

FLOW METER READING WITH IMAGE RECOGNITION SECURED WITH MASK AND SOFTWARE CONNECTED BY MOBILE DEVICE

BACKGROUND OF THE INVENTION

Field of the Invention

The present invention relates generally to a method, system and apparatus for meter reading with secured image recognition, and more particularly relates to a method, system, and apparatus for flow meter reading with image recognition secured with mask and software connected by mobile device.

Description of the Related Art

The value of water and energy may be greater than its market price under stressed situations. Stressed situations can include where if during a couple of days (anywhere: house, business, shopping, etc.) there is no available water to flush the toilets or use for bathing purposes. In these moments, the perception of value (not only price), will be linked to the risk of failure, and become tangible.

What is needed here is to promote a conscious sustainable use via a cognitive coach preventing stress situations when the value decouples from price (normally imposed by legal imposition/discussions between the Utility and the government).

There are several technologies aimed at high frequency data gathering (i.e. connected meters) that claim value by optimizing loss control and communicating real time consumption to users. However, reports indicate that these technologies have failed to influence consumer behavior and reduction in consumption.

Moreover, the present technologies are expensive to deploy, as they require replacing old meters (that are still working) by new technology that includes the meter and the network to connect the digital reading to an external database.

Today's utilities (i.e. energy, water, gas) rely mostly on meters that require reading by an employee. Therefore, there is a need to have a more cost-effective manner to monitoring existing flow meters and other devices that need monitoring or review.

SUMMARY OF INVENTION

In view of the foregoing and other problems, disadvantages, and drawbacks of the aforementioned background art, an exemplary aspect of the present invention provides a method, system, and apparatus for flow meter reading with image recognition secured with mask and software connected by mobile device.

One aspect of the present invention provides a method of reading a device, the method including generating a first image of the device, creating a mask of the device according to a database, generating a second image based on the mask, recognizing a type of device based on the second image, analyzing the second image to extract information based on the type of device, and validating the extracted information according to the database.

Another aspect of the present invention provides computer program product including a computer readable storage medium having program instructions embodied therewith, the program instructions and hardware descriptions readable and executable by a computer to cause the computer to generating a first image of a device, creating a mask of the device according to a database, generating a second image based on the mask, recognizing a type of device based on the second image, analyzing the second image to extract information based on the type of device, and validating the extracted information according to the database.

Yet another aspect of the present invention provides system, including a network, a virtual computer connected to the network, including a virtual memory storing computer instructions, a virtual processor executing the computer instructions and configured to generate a database with a plurality of images of devices and information of the devices, and a mobile device, comprising a computer readable storage medium having program instructions embodied therewith, the program instructions and hardware descriptions readable and executable by a computer to cause the mobile device to generating a first image of the device, creating a mask of the device according to the database, generating a second image based on the mask, recognizing a type of device based on the second image, analyzing the second image to extract information based on the type of device, and validating the extracted information according to the database.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

Figure 1:
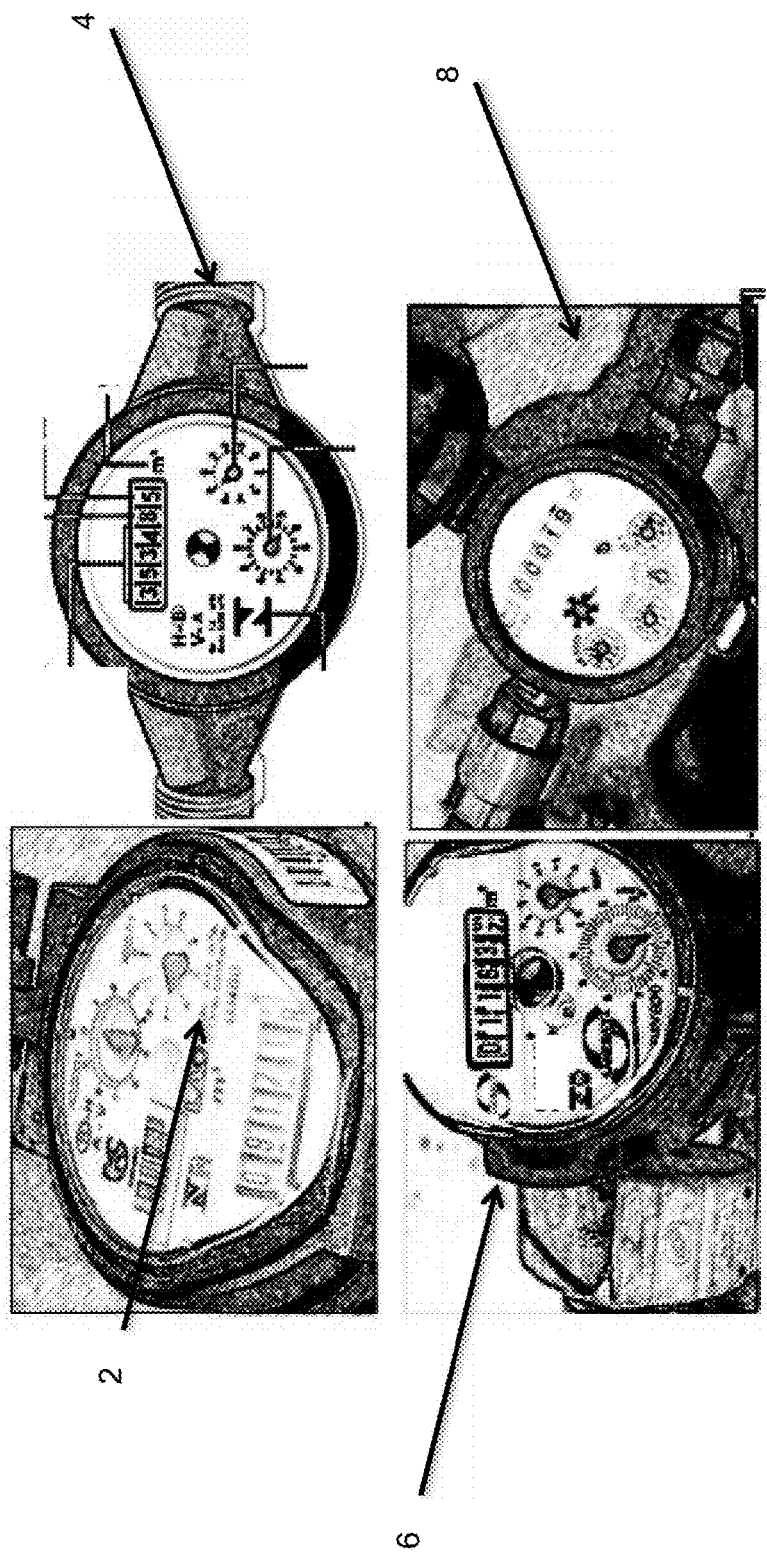
FIG. 1 illustrates examples of different types of flow meters.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Today's utilities (i.e. energy, water, gas) rely mostly on flowmeters that require reading by an employee. The present invention uses image interpretation in place of the visual inspection for reading any type of device such as analog, digital or mix types. It is also intended to address the difficulty of having more frequent (i.e. compared to the monthly) meter readings (i.e. at peak hour for energy consumption) at very low cost with validation and with a secured verification of the meter and of the transaction.

The present invention proposes an alternative, low cost and highly engaging method (presented as a mobile device application ("app")) that uses available meters associated with mobile photos (i.e. water or energy or gas) to validate the consumption in a specified time frame in a secured way. This software app will securely send the information of the photo, position and time to a cloud application that will be in charge of transforming the secured images, into alfa-numeric information, analyze the consumption, and evaluate the cost between two readings. The devices that can be read is not limited to flow meters or other types of meters. The devices to be read can be any type of device that may require a visual inspection or cannot transmit the data for analysis.

The present invention includes a method or app (i.e., a computer application including a software application as downloaded by a user to a mobile device) to use a secured photo of a flow meter or other device that needs a reading from a mobile device that is able to interpret and validate the location and the reading into alfa-numerical information and send to, for example, a cloud server or other type of server. It is based on first validation step of association of the mobile device that makes the photo and the meter (i.e. water or energy, or gas) serial number and place, where this provides a secured basis for future communication of the app and the server.

The app that provides the connection allows, via a cloud service, to retrieve previous readings and calculate the equivalent price of the consumption between two reading events and minimal cost. This is also a way to influence the behavior of the user by indication of sustainable behavior suggestions.

Figure 2A:
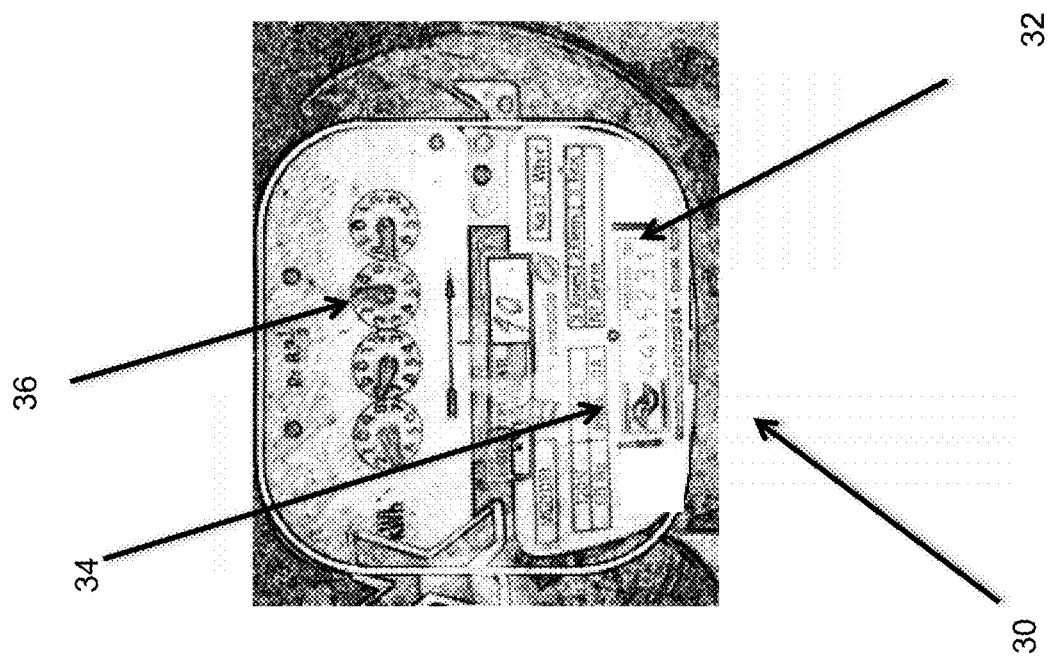
FIG. 2A illustrates a position of identification and output of a flow meter.

Given the variety of meter types, a specific methodology to be able to recognize and interpret any type of flow meter is proposed. FIGS. 1 through 2C illustrate examples of different types of flow meters. There are many variations of the flow meter displays as seen in the examples. However, it is not necessary that devices being read are flow meters as it can be any kind of device that may have a visual readout and identification or that are not capable of transmitting at least in part their data.

Referring to FIG. 1, a first type of flow meter 2, a second type of flow meter 4, a third type of flow meter 6 and a fourth type of flow meter 8 have different positions and types of the output and identification information. The output can be a mix of digital and analog type dials and the shape of the meters vary also with different locations of the output and identification information. A validation step of association of the mobile device makes use of the photo of the meter (i.e. water or energy, or gas), which includes serial number (identification), place (location) and local photos of meter as explained further below. If a serial number is not provided, the image itself can used to discern the type of meter device when compared to a plurality of images stored in a database.

The first set of steps involves recognizing the type of meter device. FIG. 2A illustrates a position of identification and output of a flow meter 20. The serial number 22 is located on a side of the flow meter 20. The flow meter 20 is not easy to associate with a top-down photo where the reading is done. Multiple images may need to be taken with a side view image and a top image of the reading.

The method of the present invention needs to be able to discern this serial number 22 from other identification markers that are not pertinent such as the bar code or other type of identification markers 24 that do not identify the flow meter itself. The flow meter 20 also includes an area as on the top area the digital dials for the output reading 26. Two different angles of images may need to be taken with a mobile device in order to read both the output 26 and the identification 22. A compilation of these two images or each image individually can be analyzed.

Figure 2B:
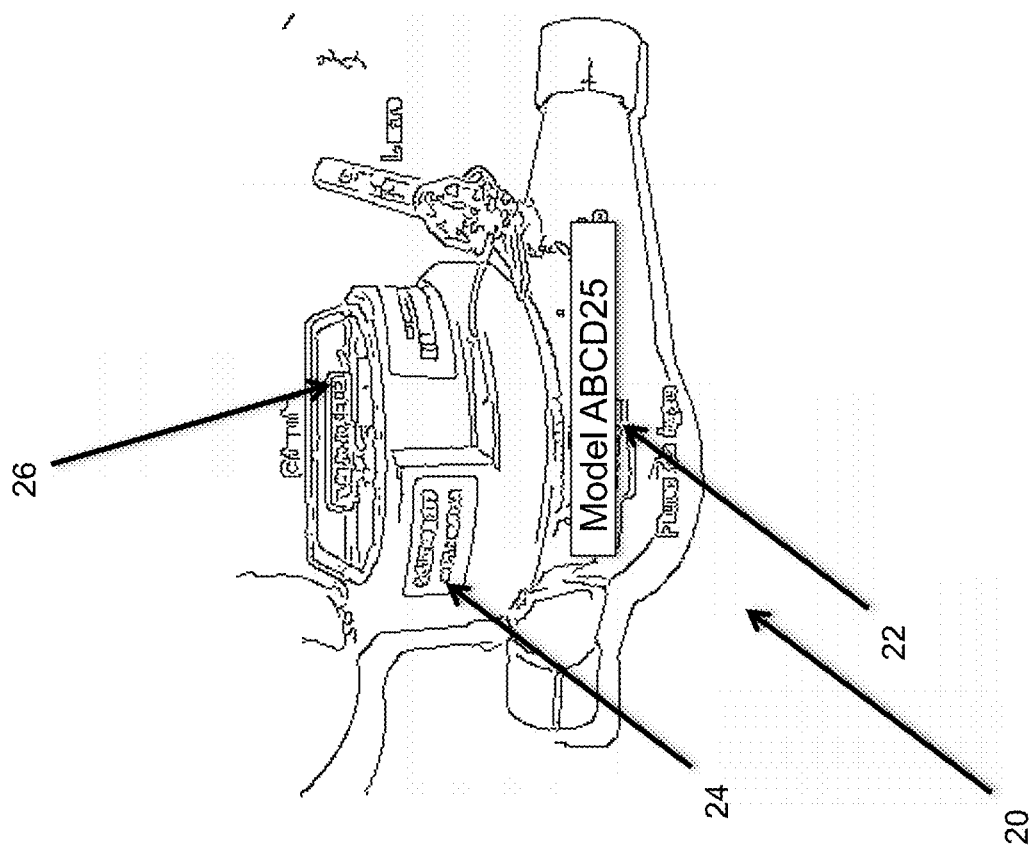
FIG. 2B illustrates a position of identification and output of another flow meter.
Figure 2C:
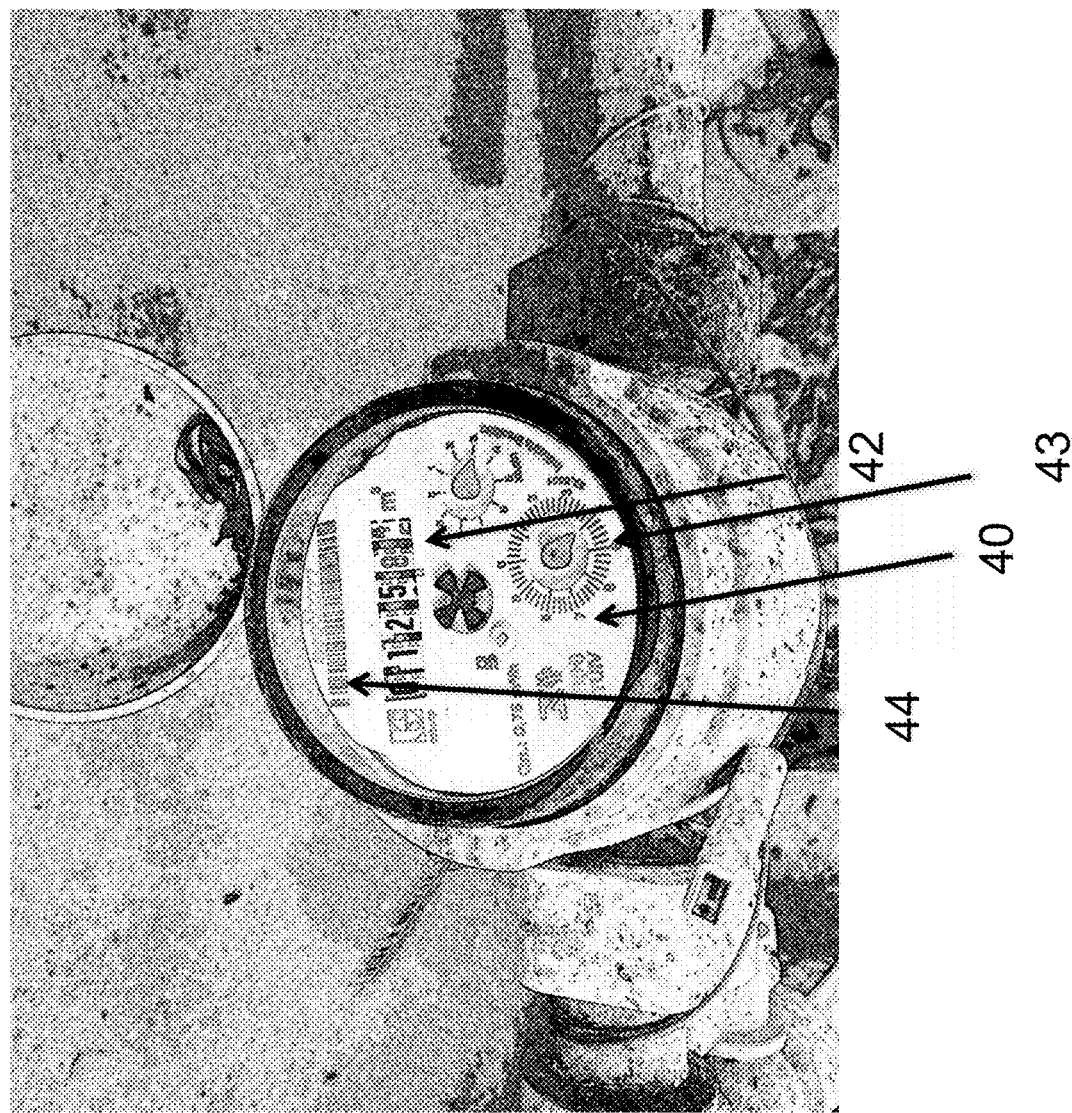
FIG. 2C illustrates a position of identification and output of yet another flow meter.

FIG. 2B illustrates a position of identification and output of another flow meter. A single image can show the serial number identification 32 of the flow meter and the output reading 36, while differentiating from other markers 34 present.

FIG. 2C illustrates a position of identification and output of another flow meter. The flow meter 40 on a side of the device includes a digital type reading 42, analog type dial reading, and markers 44 for identification 44 of the device 42e.

Figure 3:
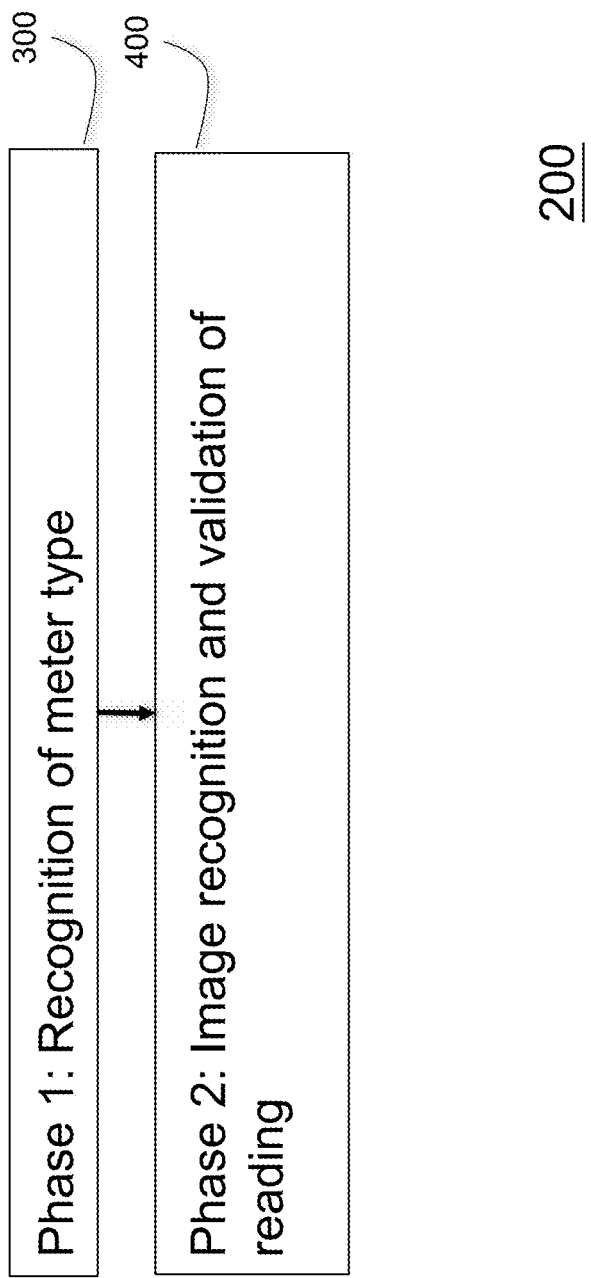
FIG. 3 illustrates the general methodology of an exemplary embodiment.

FIG. 3 illustrates the general methodology 200 of an exemplary embodiment. The methodology of the present invention 200 includes a first phase of the methodology where there is a recognition of the meter type 300, and then thereafter there is an image recognition and validation of reading performed in the second phase 400.

Figure 4:
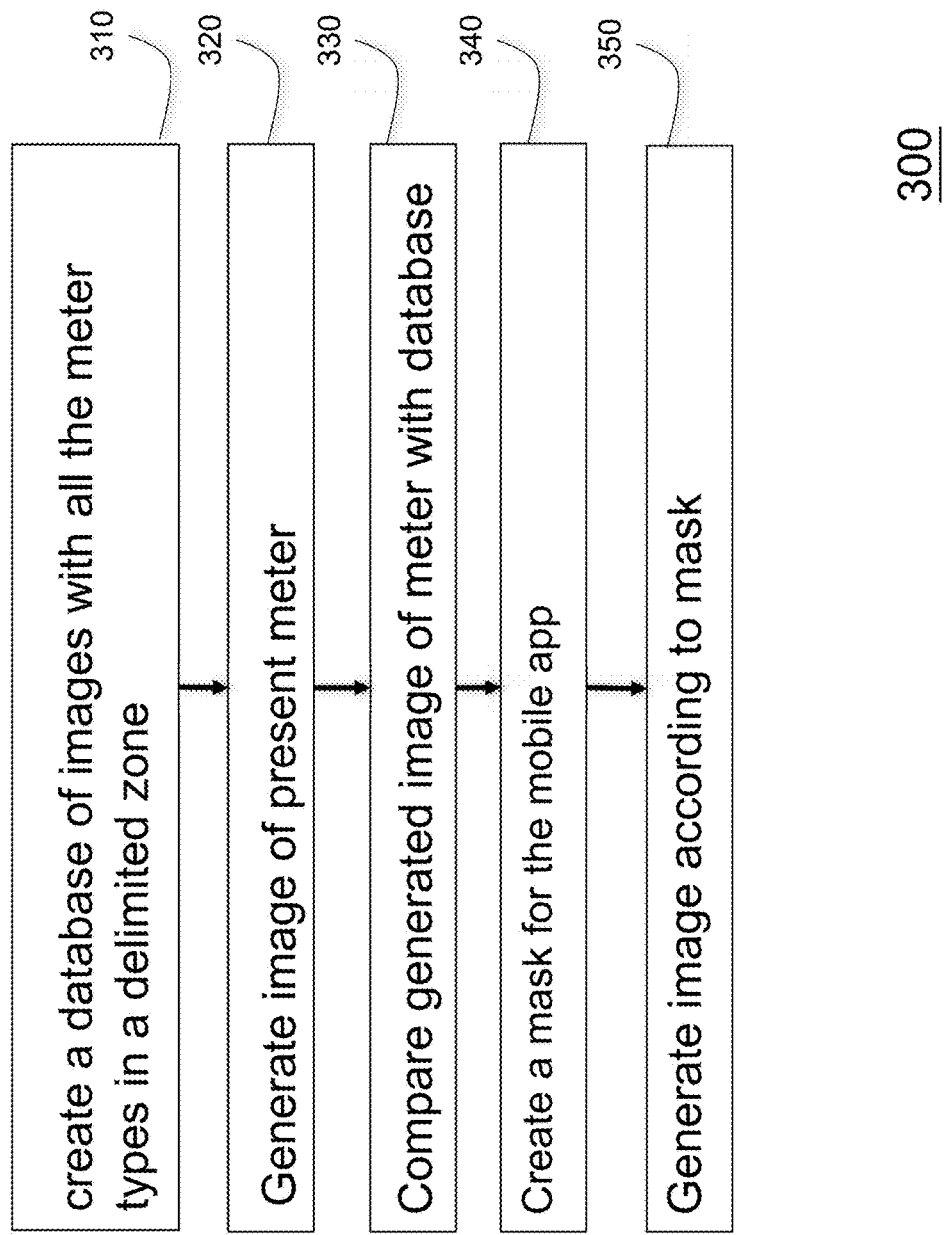
FIG. 4 further details the first phase of the exemplary embodiment.

FIG. 4 further details the first phase of an exemplary embodiment. The first phase 300 of the recognition of the meter type includes the following additional steps. In a first step 310, create a database of images with all the meter types in a delimited zone (i.e. a city). In fact, these types are limited due to local regulations (i.e. Inmetro in Brazil, New York City in United States, etc.) of Utility operators and business partners.

Then, in the next step 320, generate an image of the present flow meter that needs to be read with a mobile type device via an app that is installed in the mobile type device.

Then, in the next step 330, use the image created in the setting of the app. to compare to this database and based on a similarity measure select the type (i.e. meter model) that most resemble the photo in the database.

Thereafter, create a 'mask' for the mobile app. based on the image setting, but with an opening (i.e. empty place) where the effective pointer (that provides the reading) will be available for the new reading once the camera is positioned in the perfect spot to be taken in the next step 340. In cases where it is possible to have the serial number in the same image it will be also be part of the reading window and as such used to confirm the origin of the photo as the same of the initial setting one.

Then, based on the mask, a user can take another photo of the meter in step 350 so that the information can be aligned accordingly.

Figure 5:
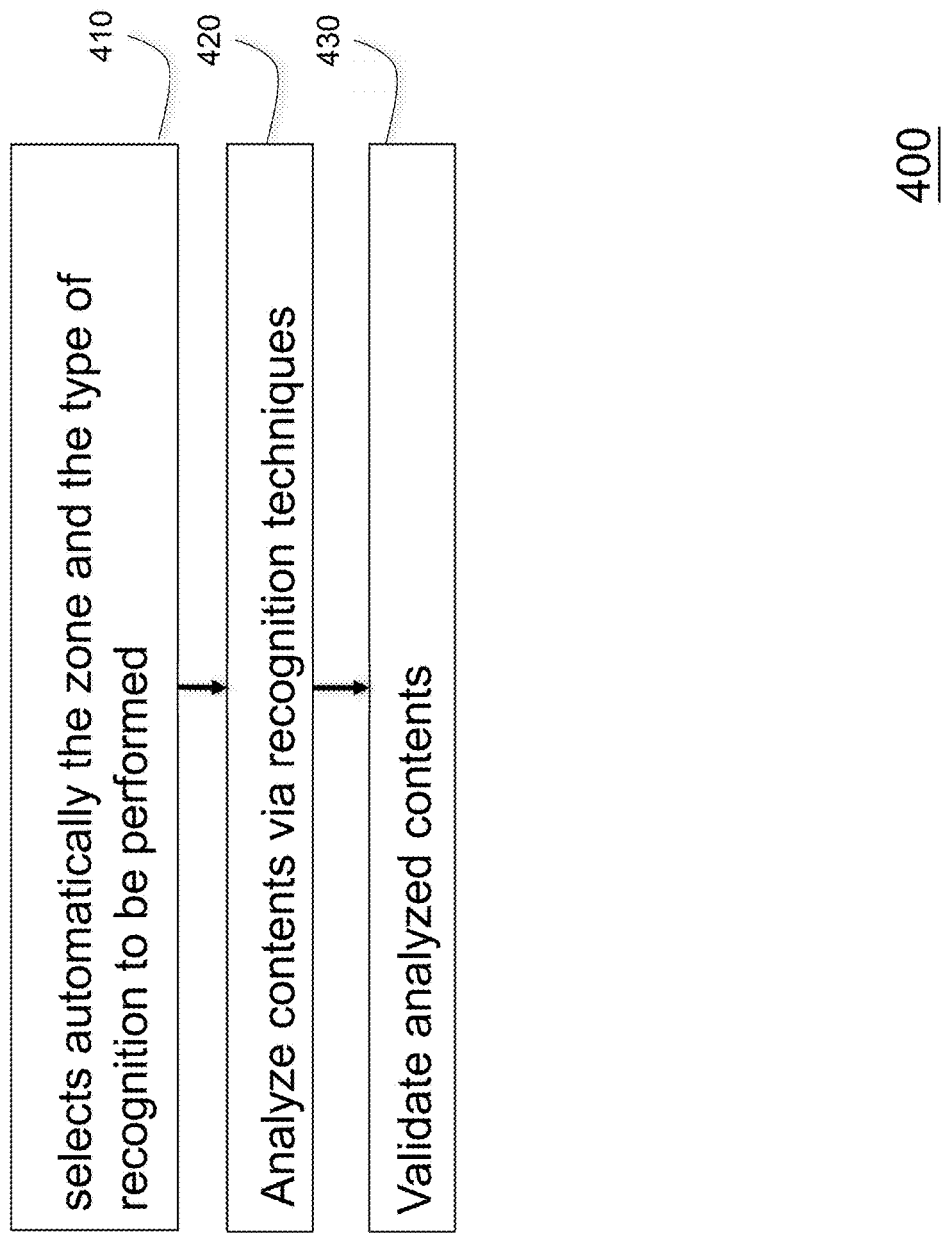
FIG. 5 further details the second phase of the exemplary embodiment.

FIG. 5 further details the second phase of an exemplary embodiment. The second phase 400 of image recognition and validation of the reading is further detailed as follows.

In a first step 410, based on the type of meter, the present methodology 200 selects automatically the zone and the type of recognition to be performed (i.e. pointers or analog digits or a mix of both) for the reading.

Then in step 320, use a variety of image recognition techniques, including OCR (Optical Character Recognition) to analyze the contents of the predefined zones within the mask where the reading values are expected to be located. In the present invention, the image recognition can discern between analog, digital and mix of analog and digital readouts of the meter devices.

After the reading values have been derived from this analysis in step 320, check the consistency of the resulting measures using previous values in the utility database that the app has access to in the cloud (e.g. all reading should be increasing within a reasonable consumption pattern) in step 330. Therefore, the information that is analyzed is certified and validated in step 330.

Referring to step 330 of certification and validation, the app's initial setting may require the creation of a first set of images from the meter that will be used as a mask. These are then associated with the information of the operator chip; IMEI (International Mobile Equipment Identity, reference of the mobile apparatus); and GPS (Global Positioning System) (if available), this information is stored into the app as an encrypted code (e.g. "BaseEcode" or a 'stamp' unique to this device and flow meter) that will be the secured signature of that mobile device into the cloud service that the app uses to calculations and storage. In this way the utility can have a track record of the device and specific time of the reading validated.

Figure 6:
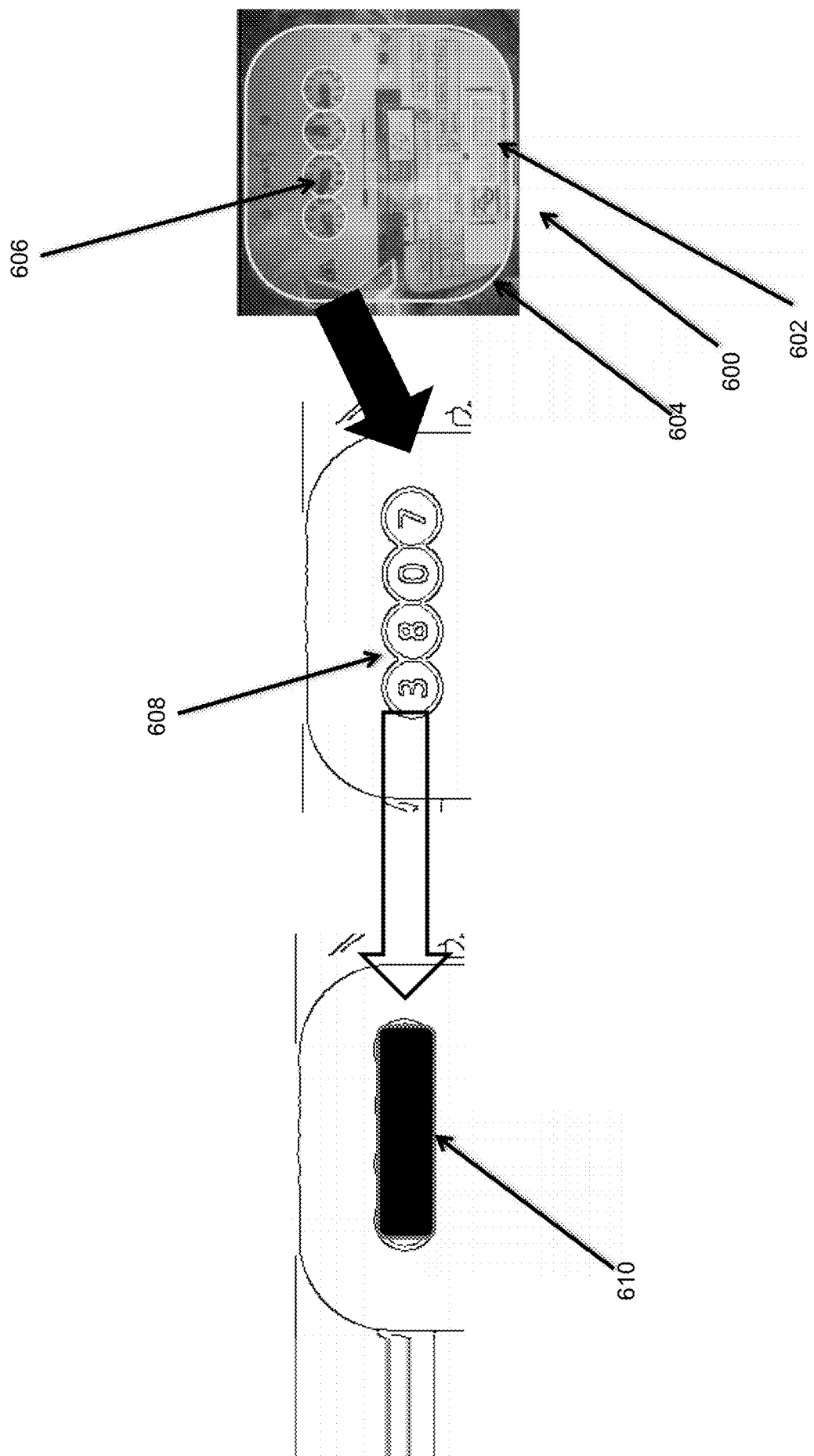
FIG. 6 further details the step of using the mask in the exemplary embodiment.

FIG. 6 further details the step of using the mask in the exemplary embodiment. The mask helps the user guarantee that the user is selecting the best position to take the photo and provide the best possible image for the image analysis of the reading. The flow meter 600 includes a mask, where there is an outline of the face 604 of the meter 600, with an outline of the area of serial number 602 identifying the meter 600. The position of the serial number 602 is to guaranty of precedence. The mask also includes outlines for each of the analog type dials 606 for the output reading. These set of outlines 602, 604 and 606 help the user position the mobile device photo for the exact position. Then based on the mask, the analog dial information can be translated into digital numerical format 608. The outline 606 helps to position the pointer for the optical character recognition (OCR) in order to generate the numerical output 608. Therefore, the mask 610 for generating the output reading is created.

Figure 7A:
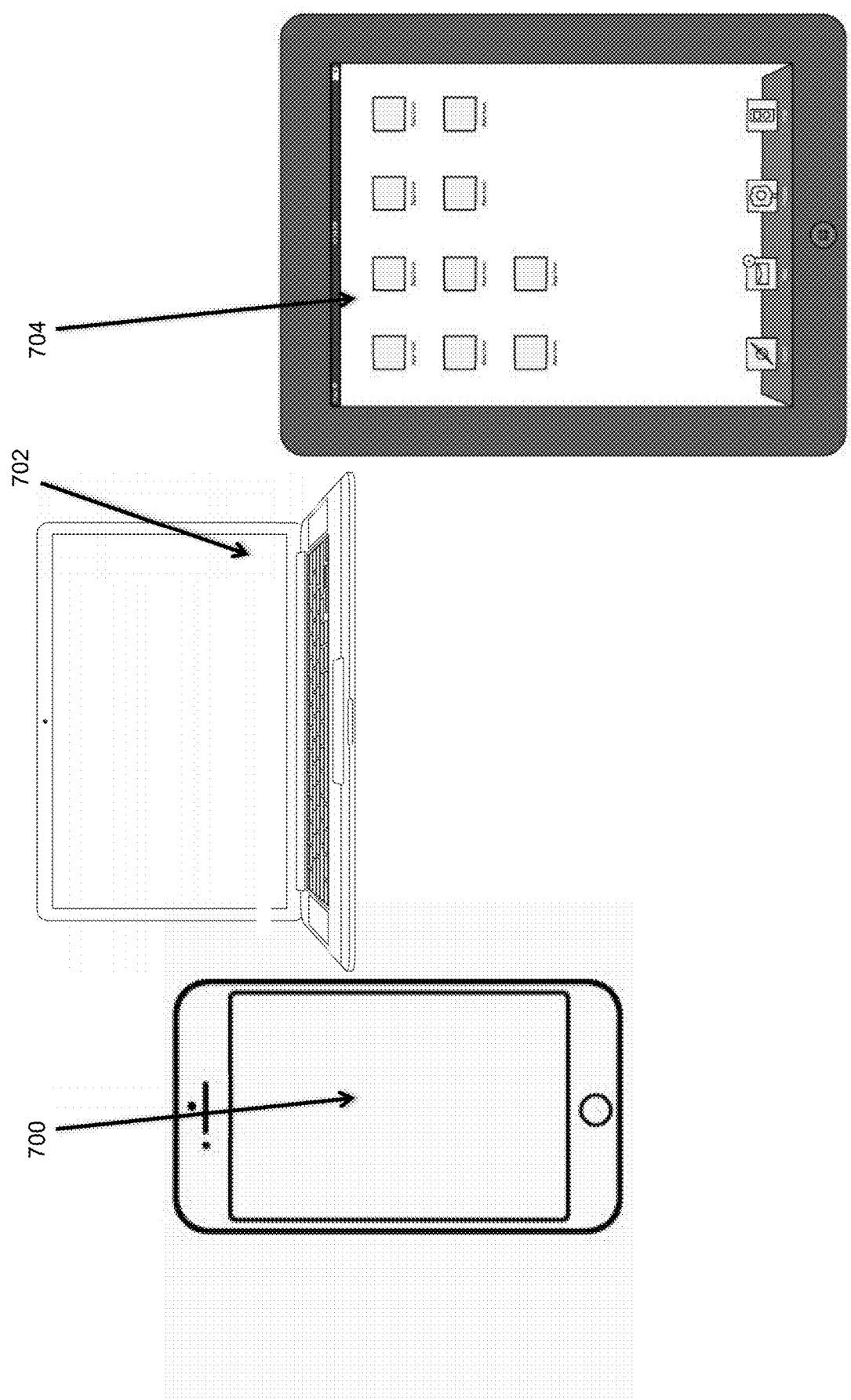
FIG. 7A shows example mobile devices.

FIG. 7A shows example mobile devices. The mobile devices can include, for example, a smart phone 700, a portable computer 702, or a table device 704, or any other computing device that includes a camera and a transceiver or other type of communication unit that can communicate with a server, such as a cloud server.

Figure 7B:
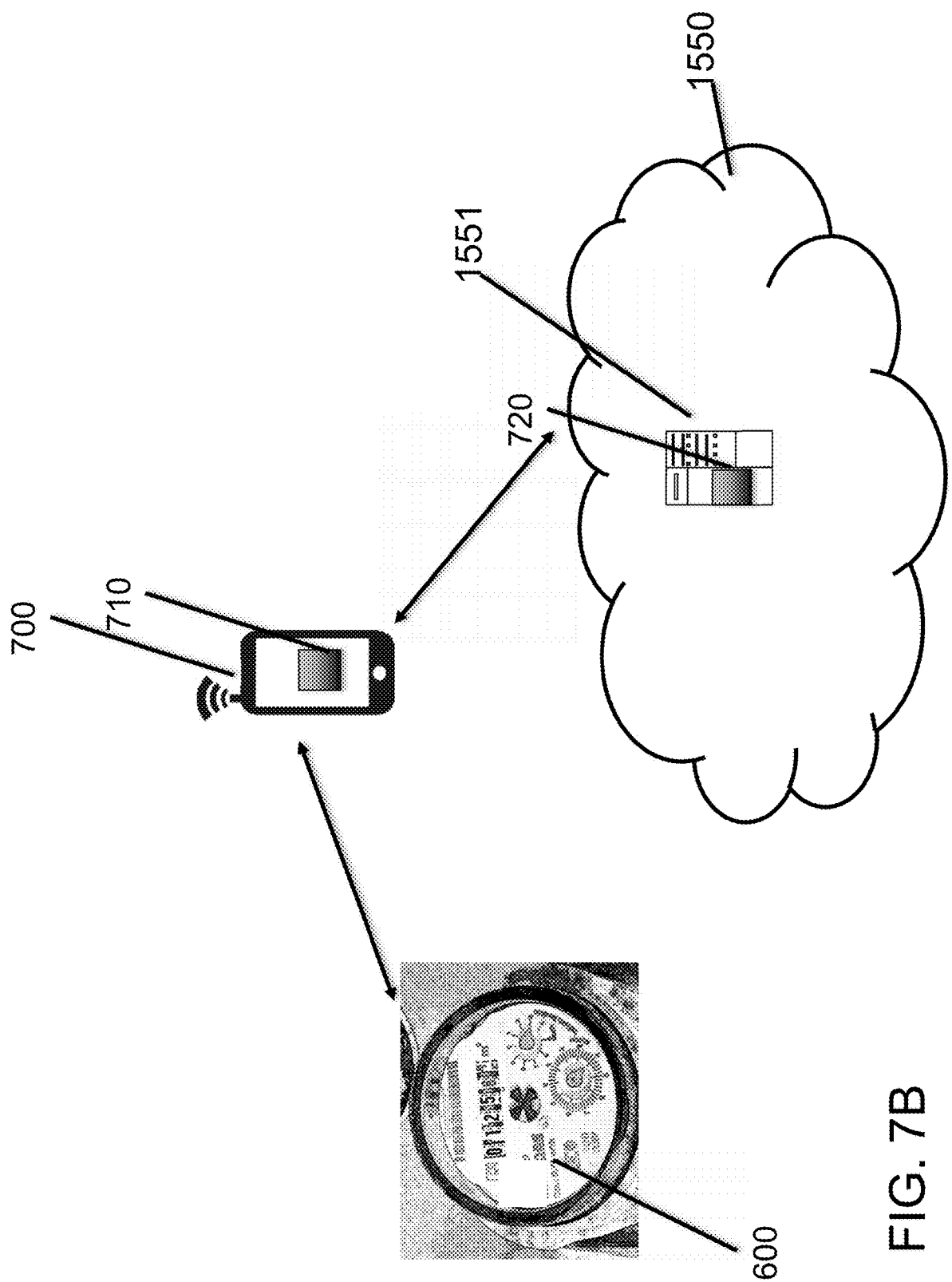
FIG. 7B illustrates a mobile device communicating with a server.

FIG. 7B illustrates a mobile device communicating with a server. The smart phone 700 can take images of the meter device 600 and transmit the images to the cloud computing environment 1550 that includes a cloud server 1551 that can be compared with information stored in a database 720 that is stored in the cloud server 1551. The cloud server 1551 can include the database 720 of images of the flow meters and other pertinent information. The smart phone 700 can include a camera to take the images and a communication unit to communicate with the cloud server 1551.

Referring to FIG. 7B, the mobile app 710 is installed in a specific mobile device 700. The app's initial setup requires the creation of a first set of images from the meter device 600. These images are then associated with the information of the SIM (subscriber identification module) Card, the device's reference number (such as IMEI (ref of the mobile apparatus) in a GSM (global system for mobile communication) network) and GPS coordinates (if available). If the mobile device 700 does not have a SIM card, as in a purely CDMA (code-division multiple access) network protocol system, the MEID (Mobile Equipment Identifier) can be obtained. If the meter device 700 has both GSM and CDMA protocol than both the IMEI and MEID can be obtained as examples for the mobile device's 700 reference number. Other device identifications can be used based on different communication protocols. This information is stored into the app as an encrypted code (e.g., &BaseEcode8 or a +stamp, unique to this device and flow meter) that will be the secure signature of that mobile device 700 when connecting to the cloud service 1550 used for calculations and information storage.

During normal use, this encrypted code (e.g., &BaseEcode8) guarantees that the meter device 700 is the one associated to the user and is also used to encrypt the information transmitted. Any new image is encrypted with this encrypted code (e.g., &BaseEcode8) and sent together with a time stamp and actualized GPS coordinates of the device 700. The time stamp can be used to verify the validity of the reading (e.g. by anticipating the range of possible reading values based on the time of the last reading) and the GPS coordinates can be used to confirm the identification of the meter device 700.

Therefore, the present methodology addresses the following challenges of how to certify that the meter reading is from a particular user, how to facilitate the OCR in case of bad photo conditions, and how to validate the logical evolution of the reading with time, and avoid reading errors.

Parts of one or more embodiments may be a device, a system, a method and/or a computer program product to control any aspects of the above-mentioned techniques mentioned above. The computer program product in accordance with one or more embodiments includes a computer readable storage medium (or media) having program instructions thereon for causing a processor to carry out aspects of one or more embodiments.

Figure 8:
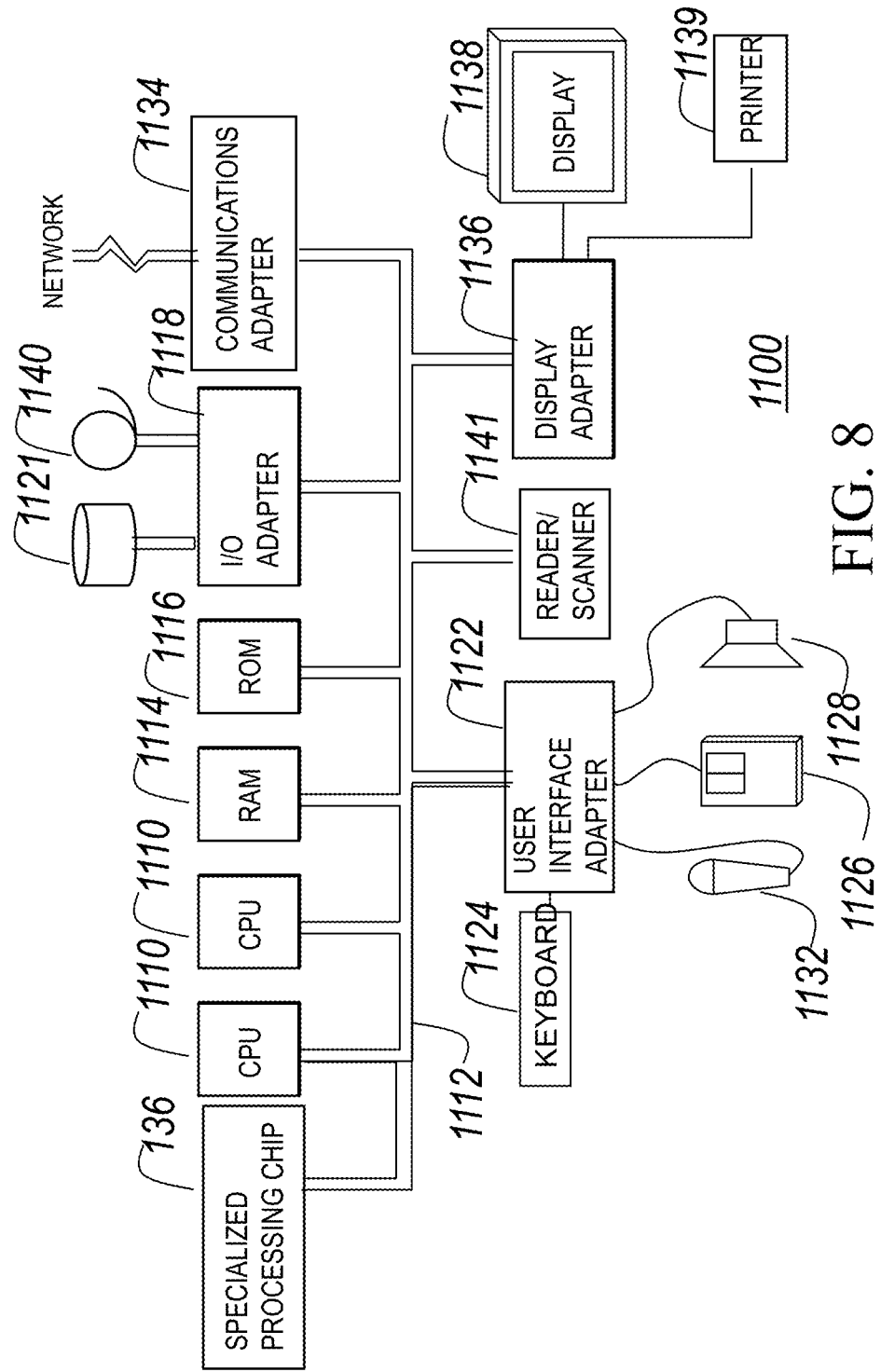
FIG. 8 illustrates an exemplary hardware/information handling system for incorporating the exemplary embodiment of the invention therein.

FIG. 8 illustrates another hardware configuration of an information handling/computer system 1100 in accordance with the present invention and which preferably has at least one processor or central processing unit (CPU) 1110 that can implement the techniques of the invention in a form of a software program.

The CPUs 1110 and a specialized processing chip 136 (e.g., specific processing chip that is specialized for extraction and enriching slide presentations from multimodal content through cognitive computing) are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110, hardware description that configures the behavior of the specialized processing chip 136, and hardware above, to perform the method of the invention.

This signal-bearing storage media may include, for example, a RANI 1114 contained within the CPU 1110, as represented by the fast-access storage for example.

Figure 9:
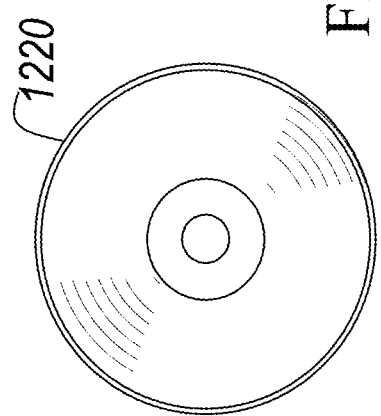
FIG. 9 illustrates a signal-bearing storage medium for storing machine-readable instructions of a program that implements the method according to the exemplary embodiment of the invention.
Figure 9:
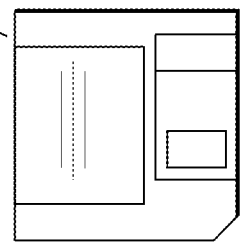

Alternatively, the instructions and hardware descriptions may be contained in another signal-bearing storage media 1200 (FIG. 9), such as a magnetic data storage diskette 1210 (FIG. 9) or optical storage diskette 1220 (FIG. 9), directly or indirectly accessible by the CPU 1110.

Whether contained in the diskette 1210, the optical disk 1220, the computer/CPU 1110, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device and hardware descriptions. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions and hardware descriptions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), or other specialized circuits may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
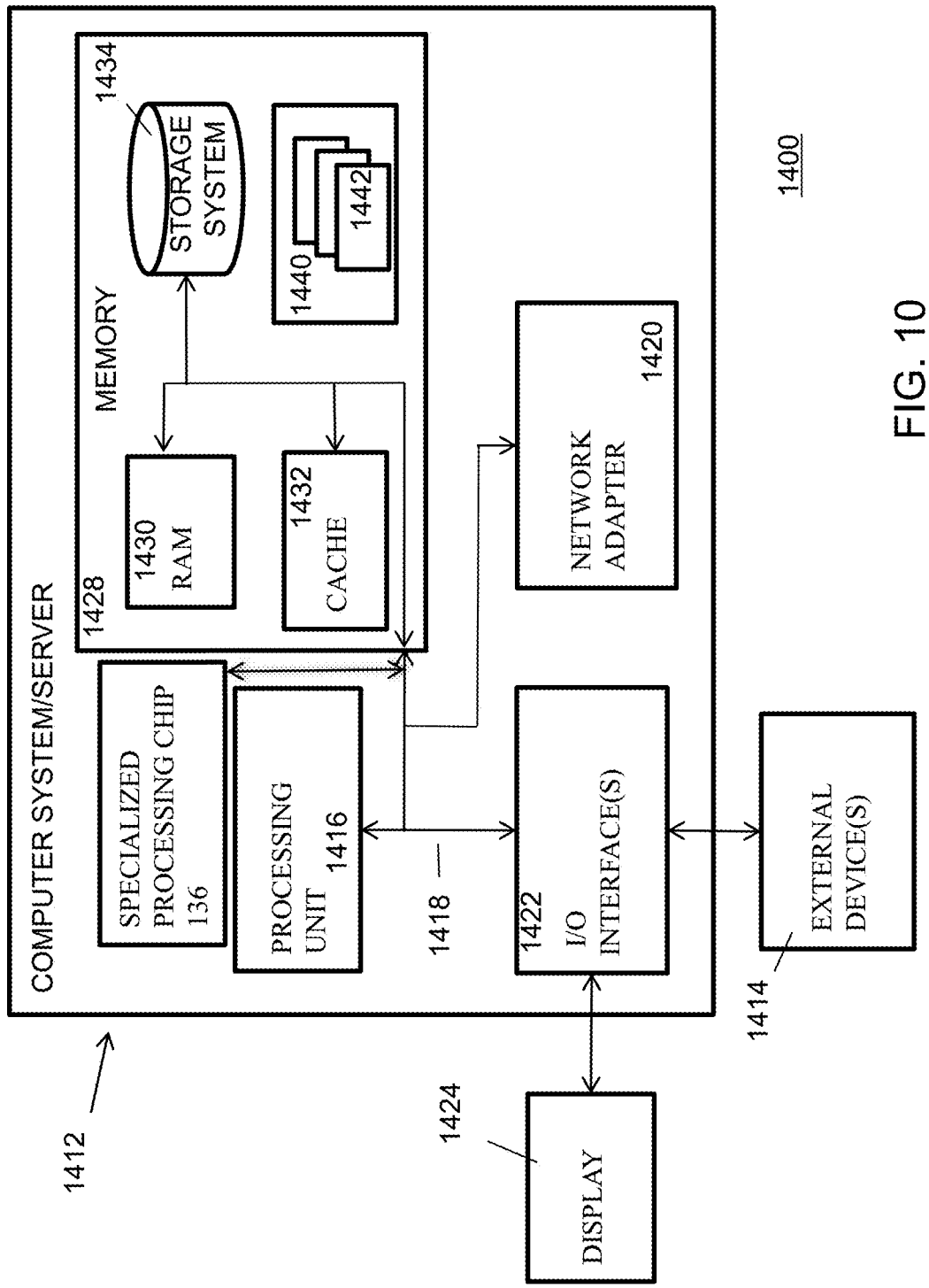
FIG. 10 depicts a cloud-computing node according to an embodiment of the present invention.

Referring now to FIG. 10, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1412 in cloud computing node 1400 is shown in the form of a general-purpose computing device. The components of computer system/server 1412 may include, but are not limited to, one or more processors or processing units 1416, a specialized processing chip 136, a system memory 1428, and a bus 1418 that couples various system components including system memory 1428 to processor 1416. The input signals can be processed by the specialized processing chip 136 instead of the processing units 1416 processing the input signals.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 11:
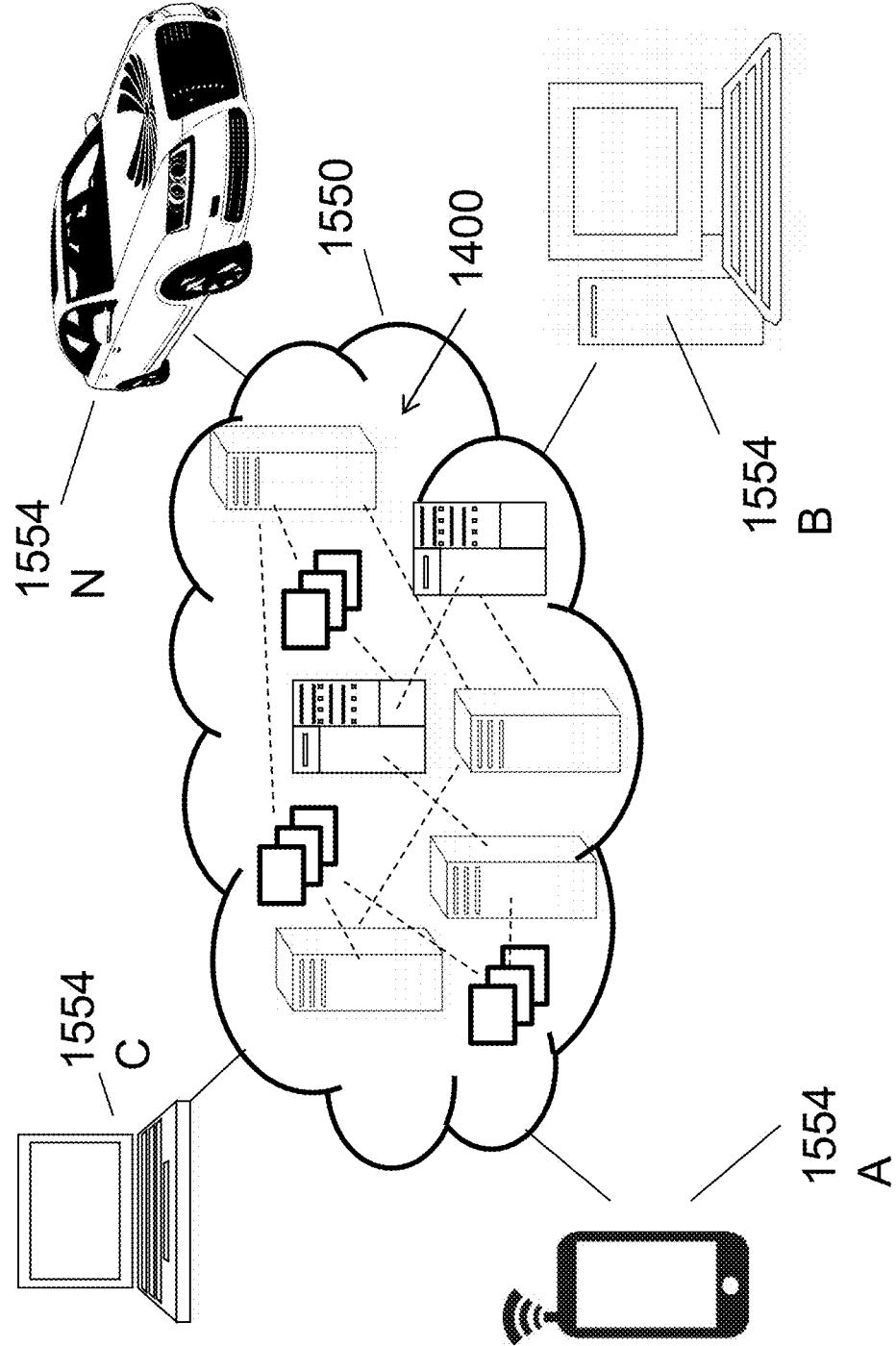
FIG. 11 depicts a cloud computing environment according to an embodiment of the present invention.

Referring now to FIG. 11, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 11 are intended to be illustrative only and that computing nodes 1400 and cloud computing environment 1550 can communicate with any type of computerized device over any type of network and/or network addressable connection (e.g., using a web browser).

Figure 12:
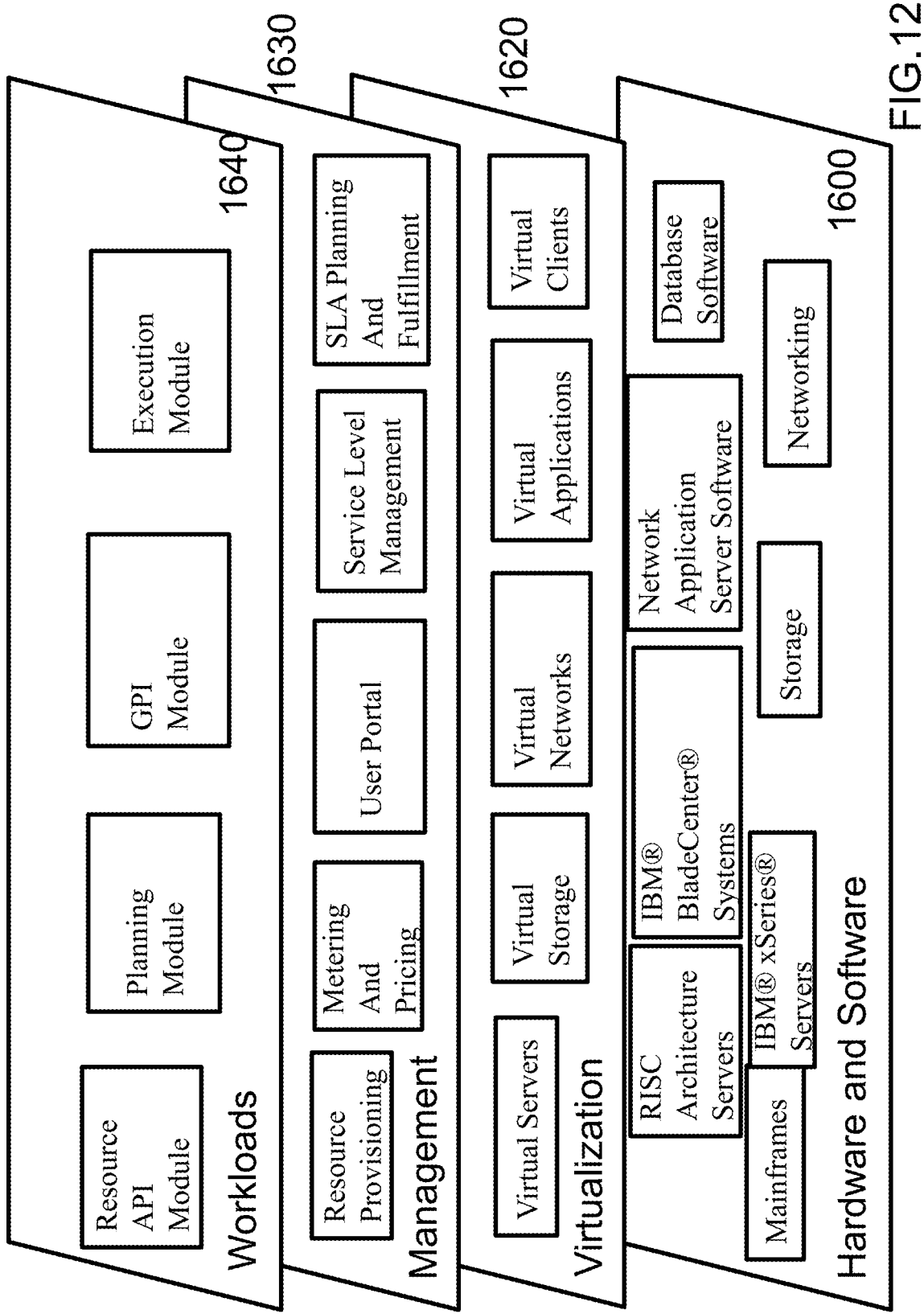
FIG. 12 depicts abstraction model layers according to an embodiment of the present invention.

Referring now to FIG. 12, a set of functional abstraction layers provided by cloud computing environment 1550 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1620 provides an abstraction layer from which the following examples of virtual entities may be provided: virtual servers; virtual storage; virtual networks, including virtual private networks; virtual applications and operating systems; and virtual clients.

In one example, management layer 1630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1640 provides examples of functionality for which the cloud-computing environment may be utilized. Examples of workloads and functions which may be provided from this layer include such functions as mapping and navigation; software development and lifecycle management; virtual classroom education delivery; data analytics processing; and transaction processing.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

We claim:

1. A method of reading a device, the method comprising:
   generating a first image of the device;
   creating a mask of the device according to a database;
   generating a second image based on the mask;
   recognizing a type of device based on the second image;
   analyzing the second image to extract information based on the type of device; and
   validating the extracted information according to the database.

2. The method according to claim 1, wherein the database includes a plurality of saved images of different types of devices in a delimited zone, and
   wherein the devices are flow meter devices.

3. The method according to claim 1, wherein the mask is generated by forming an outline of an area to be read and an area for identification of the device to provide matching information for generating the second image.

4. The method according to claim 1, wherein the analyzing includes based on the type of device, selecting automatically a zone and a type of recognition to be performed on the second image.

5. The method according to claim 1, wherein the validating includes after reading values that have been derived from the analyzing, checking a consistency of resulting measures using previous values stored in the database.

6. The method according to claim 1, wherein the database is stored in a cloud environment, and
   wherein the first image and the second image are associated with the information of a mobile device that captures the first and second images and stored in the mobile device as encrypted code that will be a secure signature of the mobile device when connecting to the cloud environment used for calculations and information storage.

7. The method according to claim 6, wherein any new image captured by the mobile device is encrypted with the encrypted code and sent together with a time stamp and actualized GPS (global positioning system) coordinates of the mobile device, and
   wherein the validating further includes the time stamp being used to verify a validity of the reading and the GPS coordinates are used to confirm the identification of the device.

8. A computer program product comprising a non-transitory computer readable storage medium having program instructions embodied therewith, the program instructions and hardware descriptions readable and executable by a computer to cause the computer to:
generate a first image of a device;
create a mask of the device according to a database;
generate a second image based on the mask;
recognize a type of device based on the second image;
analyze the second image to extract information based on the type of device; and
validate the extracted information according to the database for output.

9. The computer program product according to claim 8, wherein the database includes a plurality of saved images of different types of devices in a delimited zone, and
wherein the devices are flow meter devices.

10. The computer program product according to claim 8, wherein the mask is generated by forming an outline of an area to be read and an area for identification of the device to provide matching information for generating the second image.

11. The computer program product according to claim 8, wherein the analyzing includes based on the type of device, selecting automatically a zone and a type of recognition to be performed.

12. The computer program product according to claim 8, wherein the validating includes after reading values that have been derived from the analyzing, checking a consistency of resulting measures using previous values stored in the database.

13. The computer program product according to claim 8, wherein the database is stored in a cloud environment, and
wherein the first image and the second image are associated with the information of a mobile device that captures the first and second images and stored in the mobile device as encrypted code that will be a secure signature of the mobile device when connecting to the cloud environment used for calculations and information storage.

14. The computer program product according to claim 13, wherein any new image captured by the mobile device is encrypted with the encrypted code and sent together with a time stamp and actualized GPS (global positioning system) coordinates of the mobile device, and
wherein the validating further includes the time stamp being used to verify a validity of the reading and the GPS coordinates are used to confirm the identification of the device.

15. A system, comprises:
a network;
a virtual computer connected to the network, comprising:
a virtual memory storing computer instructions;
a virtual processor executing the computer instructions and configured to generate a database with a plurality of images of devices and information of the devices; and
a mobile device, comprising a computer readable storage medium having program instructions embodied therewith, the program instructions and hardware descriptions readable and executable by a computer to cause the mobile device to:
generate a first image of the device;
create a mask of the device according to the database;
generate a second image based on the mask;
recognize a type of device based on the second image;
analyze the second image to extract information based on the type of device; and
validate the extracted information according to the database.

16. The system according to claim 15, wherein the database includes a plurality of saved images of different types of devices in a delimited zone, and
wherein the devices are flow meter devices.

17. The system according to claim 15, wherein the mask is generated by forming an outline of an area to be read and an area for identification of the device to provide matching information for generating the second image.

18. The system according to claim 15, wherein the analyzing includes based on the type of device, selecting automatically a zone and a type of recognition to be performed.

19. The system according to claim 15, wherein the validating includes after reading values that have been derived from the analyzing, checking a consistency of resulting measures using previous values stored in the database.

20. The system according to claim 15, wherein the database is stored in a cloud environment,
wherein the first image and the second image are associated with the information of the mobile device that captures the first and second images and stored in the mobile device as encrypted code that will be a secure signature of the mobile device when connecting to the cloud environment used for calculations and information storage,
wherein any new image captured by the mobile device is encrypted with the encrypted code and sent together with a time stamp and actualized GPS (global positioning system) coordinates of the mobile device, and
wherein the validating further includes the time stamp being used to verify a validity of the reading and the GPS coordinates are used to confirm the identification of the device.

* * * * *